(12) United States Patent
Hsieh

(10) Patent No.: US 6,587,204 B2
(45) Date of Patent: Jul. 1, 2003

(54) APPLICATION OF A STEP-PHASE INTERFEROMETER IN OPTICAL COMMUNICATION

(75) Inventor: Yung-Chieh Hsieh, San Jose, CA (US)

(73) Assignee: Optoplex Corporation, Fremont, CA (US)

(*) Notice: Subject to any disclaimer, the term of this patent is extended or adjusted under 35 U.S.C. 154(b) by 7 days.

(21) Appl. No.: 09/801,335

(22) Filed: Mar. 6, 2001

(65) Prior Publication Data

US 2003/0081217 A1 May 1, 2003

Related U.S. Application Data

(60) Provisional application No. 60/258,427, filed on Dec. 27, 2000.

(51) Int. Cl.[7] .................................................. G01B 9/02
(52) U.S. Cl. ....................................... 356/450; 359/124
(58) Field of Search ........................... 356/450; 359/124

(56) References Cited

U.S. PATENT DOCUMENTS 6,169,626 B1    2/2001   Chen et al. .................. 359/279
6,222,958 B1 *  4/2001   Paiam ........................ 356/491

OTHER PUBLICATIONS

Publication—"Optical Waves in Crystals" by Ammon Yariv and Pochi Yeh, p. 290–293.
Publication—"Optical Waves in Layered Media" by Pochi Yeh, p. 150.

* cited by examiner

*Primary Examiner*—David V. Bruce
(74) *Attorney, Agent, or Firm*—John P. Wooldridge

(57) ABSTRACT

This invention is an optical communication interleave device using a variety of optical interferometer configurations where one of the beams carries a linear phase and the other beam carries a non-linear phase such that the frequency dependence of the phase difference between these two beams has a step-ike function. The present invention uses a variety of non-linear phase generators to generate this step like phase difference.

46 Claims, 12 Drawing Sheets

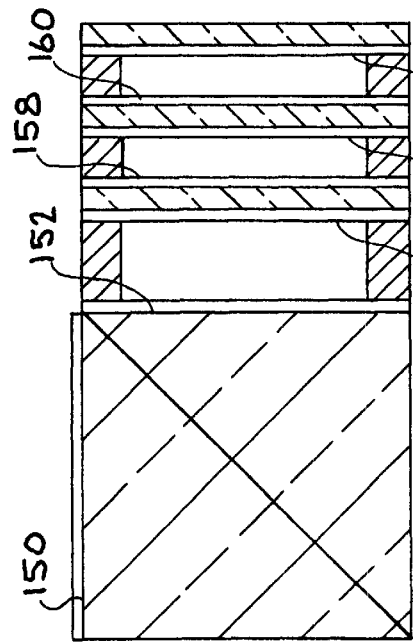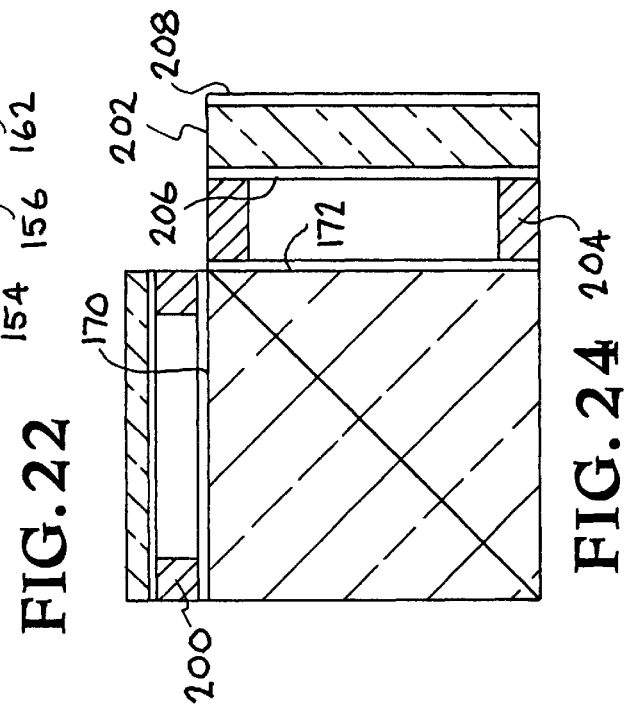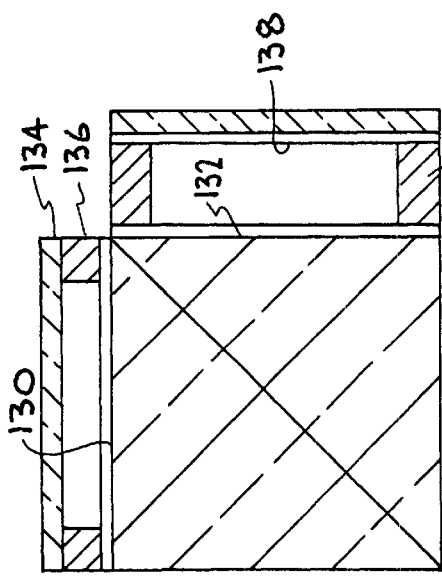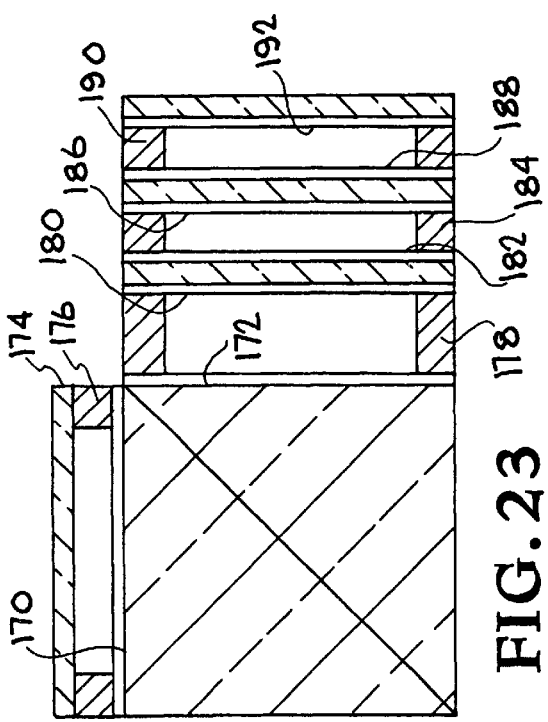

APPLICATION OF A STEP-PHASE INTERFEROMETER IN OPTICAL COMMUNICATION

This application claims priority to Provisional Patent Application Serial No. 60/258,427, titled "The Application of Step-Phase Interferometer in Optical Communication" filed Dec. 27, 2000, incorporated herein by reference.

BACKGROUND OF THE INVENTION

1. Field of the Invention

The present invention relates to optical communication, and more specifically, it relates to methods and apparatuses for interleaving frequencies in optical communication systems.

2. Description of Related Art

In dense wavelength division multiplexing (DWDM) optical communication, various frequencies (wavelengths) of laser light are coupled into the same optical fiber. The information capacity is directly proportional to the number of channels in the fiber. Since the total usable wavelength range is limited (about a few tens of nanometers), the smaller the channel spacing, the more channels can fit into the same optical fiber, therefore enabling more communication capacity.

The minimum possible channel spacing is limited by the capability of the multiplexer (MUX) and the de-multiplexer (de-MUX). Currently, the standard channel spacing is 100 GHz (0.8 nm). The manufacturing costs increase dramatically when the channel spacing is less than 100 GHz. A cost-effective method is desirable for interleaving channels thereby enabling the use of higher bandwidth filters with lower channel spacing in an optical communication system. For instance, one can use 100 GHz filters with 50 GHz channel spacing for using a one-stage interleave. Furthermore, if a two-stage interleave is implemented, 100 GHz filters can be used in 25 GHz channel spacing communication system.

FIG. 1A shows a conventional Michelson interferometer. The incident light 10 from the left-hand side of a 50—50 beam-splitter 12 is separated into two beams; 50% of the power is reflected from the beam splitter in beam 14 and the rest of light is transmitted in beam 16. After those two beams are reflected from mirror 18 and mirror 19, they are reflected by and transmitted through the beam-splitter again. The interference takes place at both the bottom and the left of the beam-splitter. The constructive interference takes place when the optical path length difference (OPD) of the two interference beams is an integer multiplication of wavelength. Since the total energy is conserved, the summation of optical power at the bottom arm and the left arm should be equal to the optical power delivered from the light source. In other words, when the constructive interference occurs at the bottom arm, the destructive interference should take place at the left arm and vise verse.

For the interferometer shown in FIG. 1, the amplitudes of the two interference beams are the same and their phase difference depends on the OPD. The various phase functions are listed in Table 1.

Table 1

Definition of Phase $\psi_{RTM}$: reflected by BS→reflected by mirror→transmit through BS.

$\psi_{TMR'}$: transmitted through BS→reflected by mirrors→reflected by BS.

$\psi_{RMR}$: reflected by BS→reflected by mirror→reflected by BS $\psi_{TMT}$: transmitted by BS→reflected by mirror→transmit through BS $\psi_{ST}$: phase introduced by the BS for S-polarized light, transmitted beam with front side incidence $\psi_{ST'}$: phase introduced by the BS for S-polarized light, transmitted beam with rear side incidence $\psi_{SR}$: phase introduced by the BS for S-polarized light, reflected beam with front side incidence $\psi_{SR'}$: phase introduced by the BS for S-polarized light, reflected beam with rear side incidence $\psi_{PT}$: phase introduced by the BS for P-polarized light, transmitted beam with front side incidence $\psi_{PT'}$: phase introduced by the BS for P-polarized light, transmitted beam with rear side incidence $\psi_{PR}$: phase introduced by the BS for P-polarized light, refleced beam with front side incidence $\psi_{PR'}$: phase introduced by the BS for P-polarized light, reflected beam with rear side incidence $\psi_B = \psi_{TRM'} - \psi_{RMT}$ (phase difference of the two interference beams in the bottom arm)

$\psi_L = \psi_{TMT} - \psi_{RMR}$ (phase difference of the two interfereince beams in the left arm)

Power Definition $P_B$: optical power in the bottom arm $P_L$: optical power in the left arm Assuming that the incident polarization is S-polarized, the two electric fields at the bottom arm can be expressed as follows.

$$\vec{E}_{TMR'} = \frac{\hat{s}}{2}\exp(i\Psi_{TMR'})$$

$$\vec{E}_{RMT} = \frac{\hat{s}}{2}\exp(i\Psi_{RMT})$$

The power at the bottom arm is as follows.

$$P_B = \|\vec{E}_{TMR'} + \vec{E}_{RMT}\|^2 = \left\|\hat{s}\cos\left[\frac{\psi_{TMR'} - \psi_{RMT}}{2}\right]\right\|^2 = \cos^2\left(\frac{\psi}{2}\right) \quad \text{Equation (1)}$$

With $$\psi_{TMR'} = 2\pi\left(\frac{v}{v_1}\right) + \psi_{ST} + \psi_{SR'} \quad \text{Equation (2.1)}$$

$$\psi_{RMT} = 2\pi\left(\frac{v}{v_2}\right) + \psi_{SR} + \psi_{ST'}$$

$$\psi_B = \psi_B^{(s)} \equiv \psi_{TMR'} - \psi_{RMT} = 2\pi\left(\frac{v}{v_0}\right) + (\psi_{SR'} - \psi_{SR})$$

where $$v_1 = \frac{C}{2L_1}; \quad v_2 = \frac{C}{2L_2}; \quad v_0 = \frac{C}{2(L_1 - L_2)}$$

In Equation (1), the total power on the bottom arm is dependant on the phase difference between the two interference beams.

When the incident polarization is P-polarized, $$\psi_B = \psi_B^{(p)} \equiv \psi_{TMR'} - \psi_{RMT} = 2\pi\left(\frac{v}{v_0}\right) + (\psi_{PR'} - \psi_{PR}) \quad \text{Equation (2.2)}$$

The phase difference of the two interference beams at the bottom arm for S-polarized light, $\psi^{(s)}{}_B$, and that of P-polarized light, $\psi^{(p)}{}_B$, will be the same when $\Psi_{SR} - \Psi_{SR'} =$ $\Psi_{PR}-\Psi_{PR'}$. In the following analysis at this section, it is assumed that the coating of beam splitter has been made such that $\Psi_{SR}-\Psi_{SR'}=\Psi_{PR}-\Psi_{PR'}=0$. Under such condition, $\psi_B=\psi^{(s)}{}_B=\psi^{(p)}{}_B$. Notice that in the derivation of equations (2.1) and (2.2), the phase introduced from the two reflection mirrors is neglected. Those phases do not have polarization dependence due to the fact that the incident angles at those surfaces are close to normal.

FIG. 2 shows the phase difference $\psi_B$ and $\psi_L$. Both of them are a linear function of frequency with slope $2\Pi v^{-1}{}_o$. As a result of energy conservation, there is a phase offset $\pi$ between them. FIG. 3 shows the corresponding optical power at the bottom (upper curve at 0 normalized frequency) and left arm (bottom curve at 0 normalized frequency). In these plots, the horizontal axis is normalized by frequency $v_o$. When the normalized frequency is an integer, all the light goes to the bottom; In contrast, as that is a half integer, the light goes to the left In other world, the light is interleaved in the frequency domain with half of the channels (integer frequency) to the bottom arm and the other half to the left arm.

The Michelson interferometer shows the fundamental requirement of interleaving. However, it is not practical to apply such an interferometer to a real interleave device since it is too sensitive to the central frequency and the line width of light source. Referring to FIG. 3, as the frequency is slightly off from the integer, part of the optical power will leak from the bottom arm towards the left arm, causing cross talk between channels. In other words, in order to make this device work, the laser line width should be zero and its central frequencies have to be perfectly locked over all the operation condition. Such frequency locking is very hard to achieve in the real world.

SUMMARY OF THE INVENTION

It is an object of the present invention to provide an optical filtering method to separate/merge the odd and even channels in an optical communication system.

It is another object of the invention is to provide and optical interleaver that utilizes an interferometer where one beam carries a linear phase and the other beam carries a non-linear phase such that the frequency dependence of the phase difference, $\psi_B$, between these two arms has a step-like function Still another object of the invention is to provide an optical interleaver that enables the use of higher bandwidth filters to have lower channel spacing communication system.

Another object of the invention is to provide optical interleaver methods and apparatuses that cost much less than existing interleaver devices and perform better.

These and other objects of the invention will be apparent to those skilled in the art based on the teachings herein.

This invention is an interleave device using an optical interferometer where one of the beams carries a linear phase and the other beam carries a non-linear phase such that the frequency dependence of the phase difference between these two arms has a step-like function. The present invention uses a non-linear phase generator (NLPG) to make the phase a non-linear function of optical frequency.

In one embodiment, a non-linear phase generator is a mirror made by a cavity. A first surface of the cavity has reflectivity less than one and the second reflection surface has reflectivity near 100%. As the light is incident onto the NLPG, it undergoes multiple reflections. When the static state is achieved, the amplitude of reflected light should be near 100% since the second reflecting surface reflects all of the incident optical power. The phase of the reflected light depends on the frequency of light and the physical properties of the cavity. For non-zero reflectivity of the first surface, the multiple reflections cause the phase to be a non-linear function of frequency.

In one embodiment of the invention, a modified Michelson interferometer, replaces a mirror with a cavity. The phase of the light beam reflecting from the cavity is a non-linear function of optical frequency. The phase of the other beam is a linear function of optical frequency. The dependence of the phase difference of these two beams on optical frequency is a step-like function with step $\Pi$.

The polarization dependent feature of phase of each beam can result in certain problems. When the phase difference has polarization dependence, the interference fringe will peak at different frequencies. Therefore, when the incident polarization includes both P and S, the fringe contrast will be degraded. Secondly, when the transmission curve is perfect for the S-polarized light, the phase offset in the P-polarized light worsens the performance of the channel isolation. The present invention provides several techniques for compensating for the polarization dependent feature of phase of each beam. This disclosure provides examples of a variety of embodiments of step-phase interferometers usable in the present invention.

BRIEF DESCRIPTION OF THE DRAWINGS

FIG. 21 is an embodiment where the topside of the cube is AR coated, the right-hand side of the cube is PR coated to be first surface of a non-linear phase generator and the mirror on the topside of cube is an extra piece.

FIG. 22 shows an embodiment where the topside of the cube is mirror coated to be a linear phase generator, the right-hand side of cube is AR coated and the non-linear phase is achieved by an external three-surface cavity.

FIG. 23 shows an embodiment where the topside and right-hand side of the cube are AR coated and the mirror for a linear phase generator and the three-surface non-linear phase generator are two external pieces.

FIG. 24 shows and embodiment where the topside and right-hand side of the cube are AR coated and the mirror for a linear phase generator and the two-surface non-linear phase generator consisting of glass cavity are two external pieces.

DETAILED DESCRIPTION OF THE INVENTION

Figure 4:
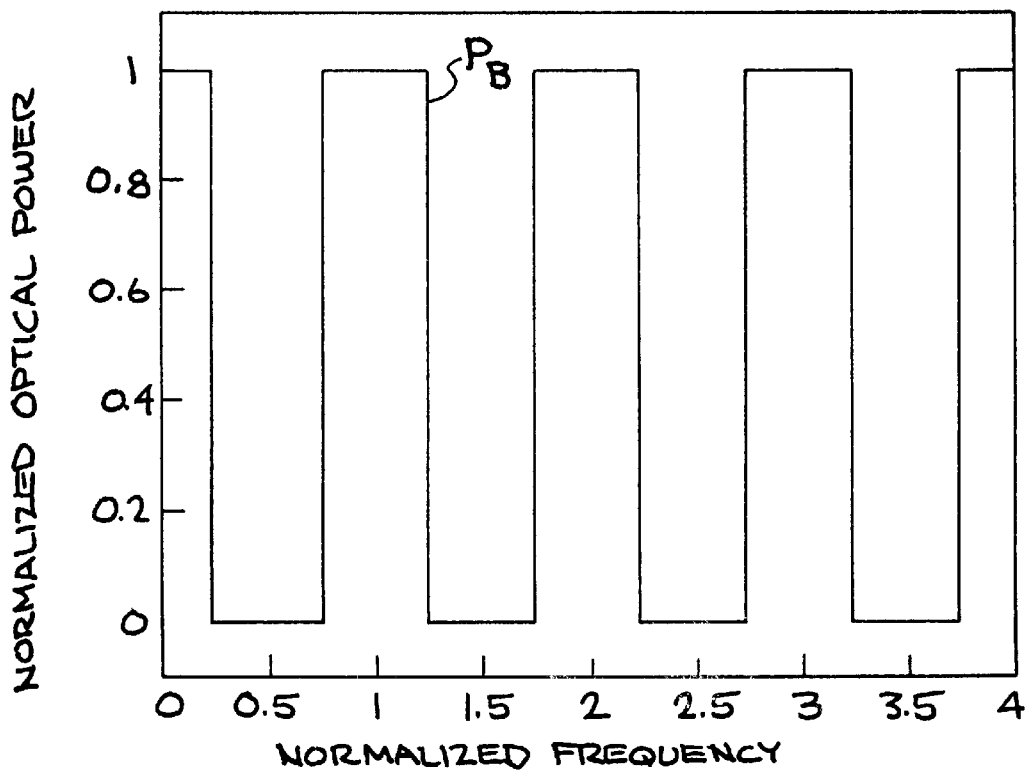
FIG. 4 shows the optical power at the bottom arm for an ideal interleave device.
Figure 5:
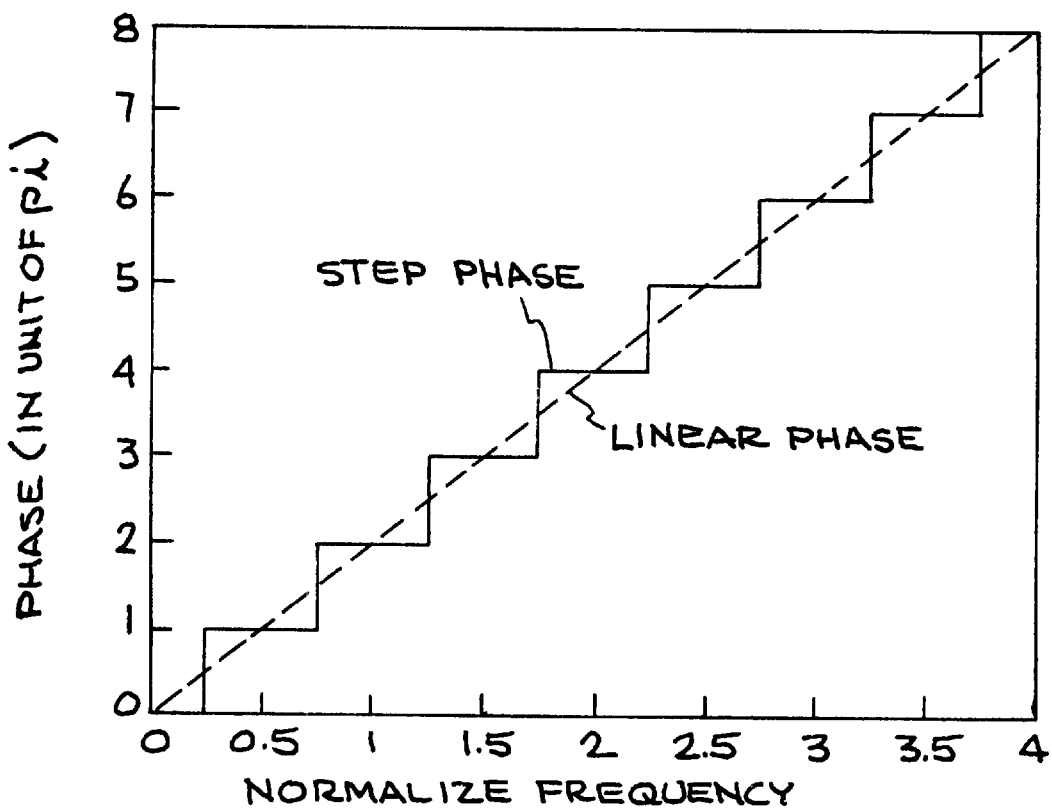
FIG. 5 shows the phase difference of the two interference beams, $\Psi_B$, at one of the output ports of an ideal interleave device.

This invention proposes to make an interleave device using an optical interferometer where one of the beams carries a linear phase and the other beam carries a non-linear phase such that the frequency dependence of the phase difference between these two interference beams at the bottom arm, $\psi_B$, has a step-like function with step $\pi$. Under this condition, the frequency dependence of phase difference between the two interference beams at the left arm, $\psi_L$, also has the same step-like function but offset vertically by $\pi$, as a result of energy conservation FIG. 4 shows the transmission curve of bottom arm for an ideal interleave device. In order to have such transmission curve, the frequency dependence of phase difference between RMT and TMR' should be, e.g., as shown in FIG. 5 where the phase difference should be equal to 2Π in the frequency range of 0.75 to 1.25 (the neighborhood of 1) and equal to Π in the range of 0.25 to 0.75 (the neighborhood of 0.5), and so on. The flat top behavior is an important characterization of any interleave device, since it is directly related to the usable bandwidth and the isolation between adjacent channels.

Figure 6:
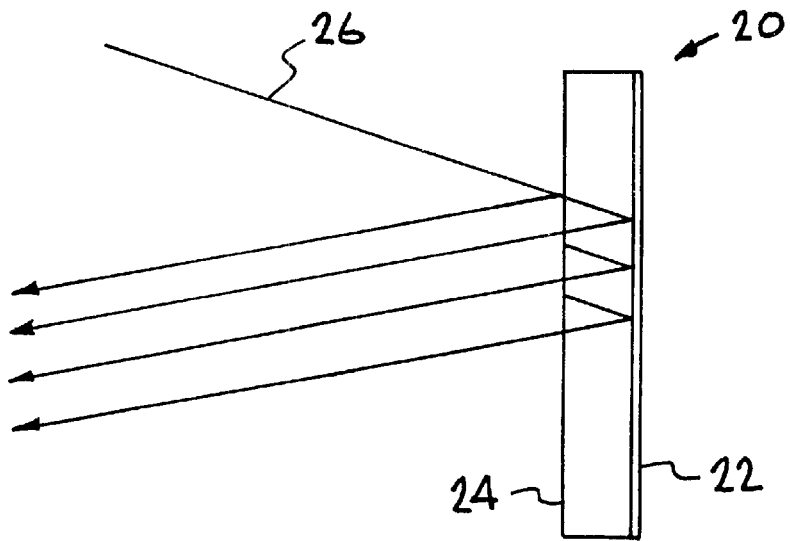
FIG. 6 shows a non-linear phase generator, consisting of two surfaces. The first surface has amplitude reflectivity of less than 1, usually between 0.3 to 0.6, and the second surface has the reflectivity close to 1.

In order to generate a step like phase difference, $\psi_B$, one has to rely on a non-linear phase generator. FIG. 6 shows an embodiment of a non-linear phase generator that is a "mirror" 20 made by a cavity. The right-hand surface 22 of the cavity has power reflectivity near 100% and the left-hand surface 24 of the cavity has a power reflectivity that is less than one. As the light 26 is incident from the left-hand side, it undergoes multiple reflections. When the static state is achieved, the amplitude of reflected light should be near 100% since the second reflection surface reflects the entire optical power incident thereon. The phase of the reflected light depends on the frequency of light and the physical properties of the cavity. The phase can be expressed as follows. See "Optical Waves in Crystals" by Amnon Yariv and Pochi Yeh, page 290–293. See also "Optical Waves in Layered Media" by Pochi Yeh, page 150.

$$\psi_c = 2\tan^{-1}\left[\alpha\tan\left(\pi\frac{v}{v_c}\right)\right]$$

$$\alpha = \frac{1-r}{1+r}$$

$$v_c = \frac{C}{2n_cL_c}$$

Figure 1:
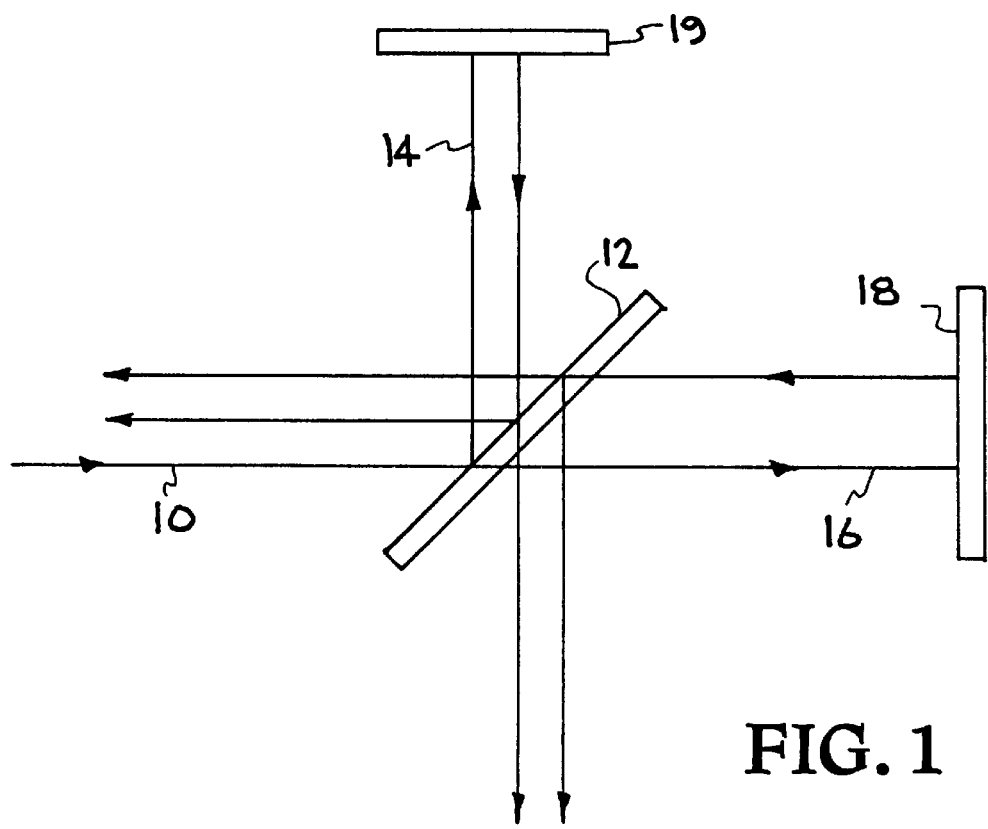
FIG. 1 shows a conventional Michelson interferometer, consisting of a beam splitter (BS) and two reflection mirrors, M1 and M2.
Figure 2:
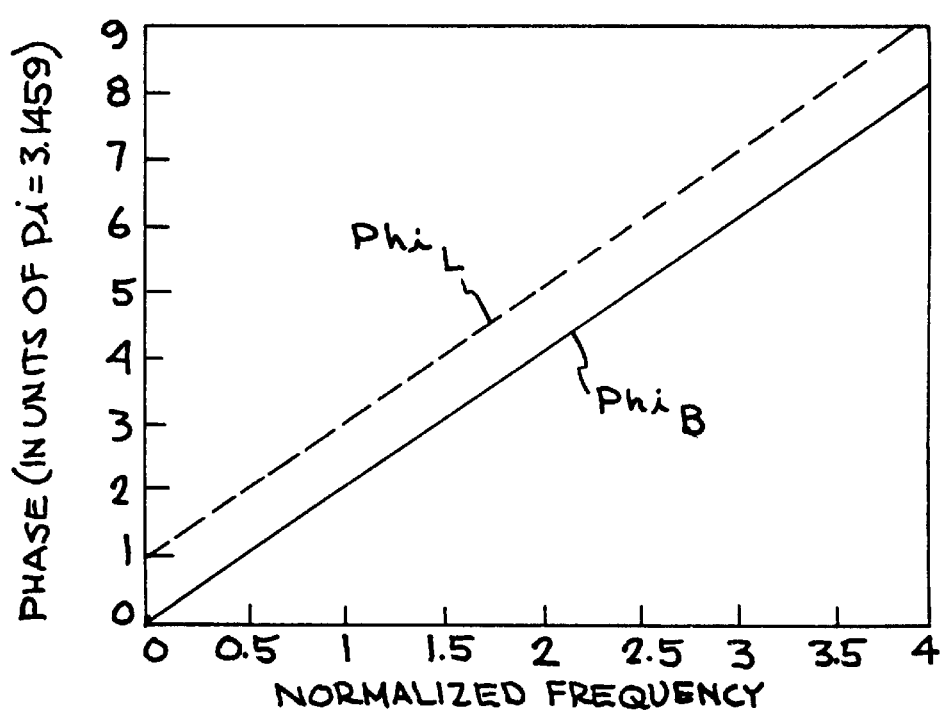
FIG. 2 shows the phase difference, $\Psi_B$, of the two interference beams at the bottom arm, and the phase difference, $\Psi_L$, at the left arm as a function of normalized frequency.
Figure 3:
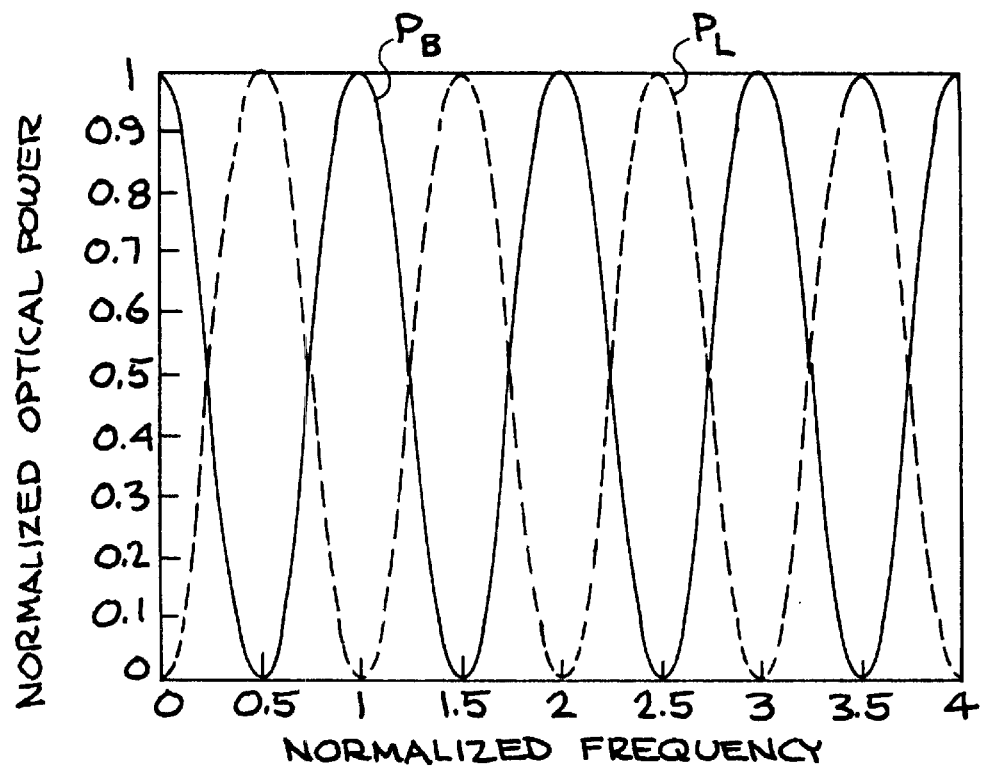
FIG. 3 shows the optical power at the bottom and left arms as a function of normalized optical frequency.
Figure 7A:
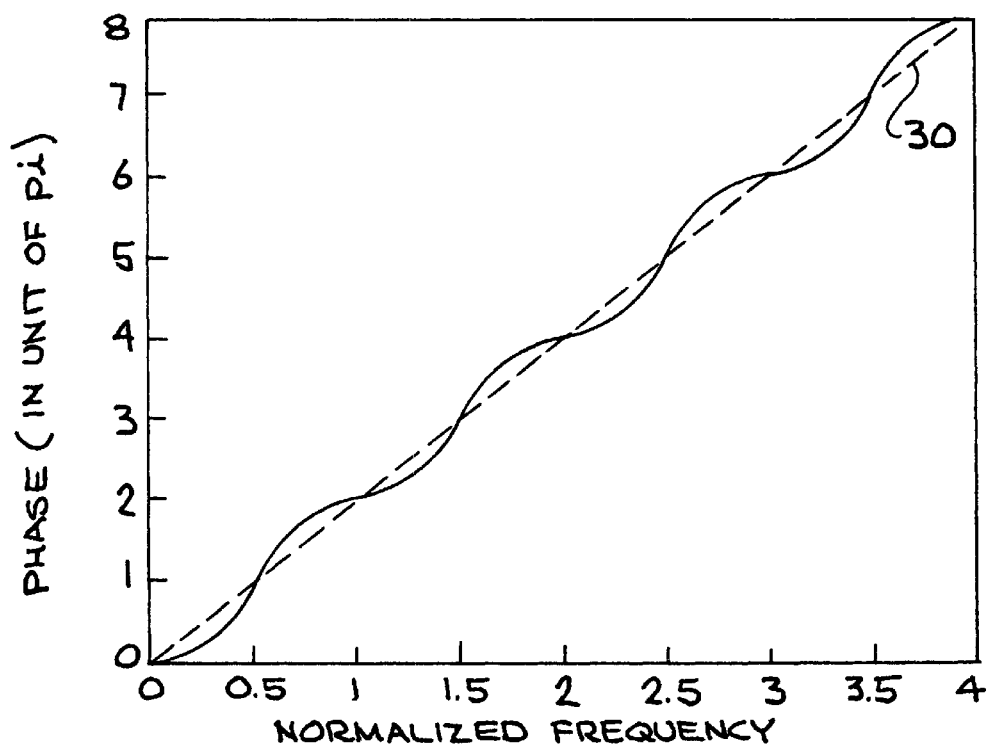
FIG. 7A shows the phase of the return beam from a non-linear phase generator as a function of normalized optical frequency for amplitude reflectivities of 0 (dash) and 0.45(solid).
Figure 7B:
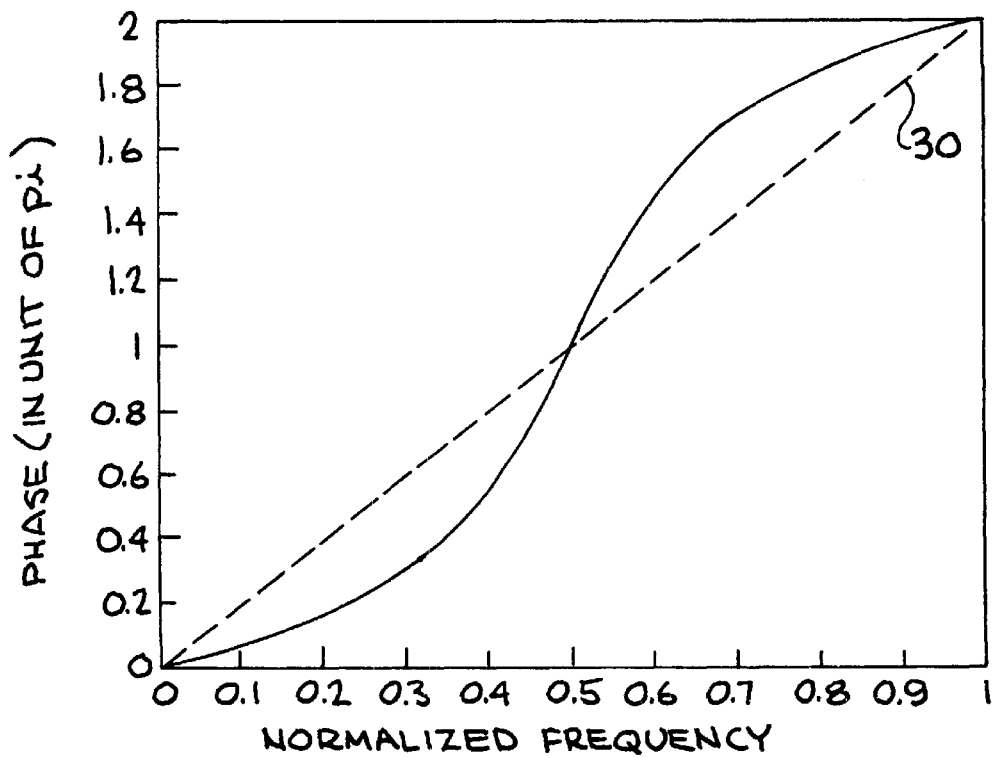
FIG. 7B is an expanded view of FIG. 7A for the normalized optical frequency within the range from 0 to 1.
Figure 8A:
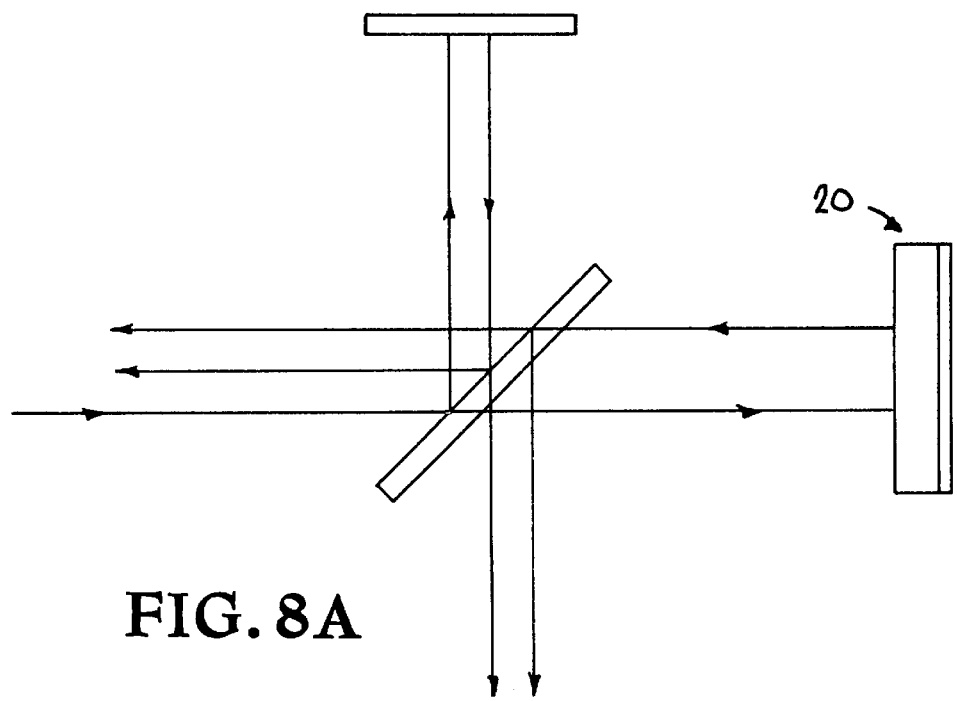
FIG. 8A shows an embodiment of a modified Michelson interferometer used as a step-phase interferometer.

Equation (3) neglects the phase-introduced by the two reflection surfaces. Taking that into account will not add complexity to the analysis but will linearly shift $\Psi_C$ in Equation (3). FIGS. 7A and 7B show the phase of reflected light from such a cavity for the amplitude reflectivity of the left surface 24 of FIG. 6, r, equal to 0 and 0.45. Notice that the horizontal axis is normalized by frequency $v_c$. For r=0, it is a linear curve 30 corresponding to the phase shift of light traveling a distance of $2L_c$. For non-zero r, the multiple reflections have to be taking into account, causing the phase to be a non-linear function of frequency. FIG. 8A shows a step-phase interferometer, modified from a Michelson interferometer, where mirror M1 (18 in FIG. 1) is replaced by a cavity 20 shown in FIG. 6. The two electric field at the bottom arm are as follows. (Assuming that the incident beam is S-polarized)

$$\vec{E}_{TCR'} = \frac{\hat{s}}{2}\exp(i\psi_{TCR'})$$

-continued $$\vec{E}_{RMT} = \frac{\hat{s}}{2}\exp(i\psi_{RMT})$$

Where $$\psi_{TCR'} = 2\pi\left(\frac{v}{v_1}\right) + \psi_c + \psi_{ST} + \psi_{SR'}$$

$$\psi_{RMT} = 2\pi\left(\frac{v}{v_2}\right) + \psi_{SR} + \psi_{ST}$$

The total energy at the bottom arm is expressed as follows.

$$P_B = \|\vec{E}_{TCR'} + \vec{E}_{RMT}\|^2 = \cos^2\left(\frac{\psi_B^{(s)}}{2}\right)$$

where $$\psi_B^{(s)} = \psi_c + 2\pi\left(\frac{v}{v_0}\right) + (\psi_{SR'} - \psi_{SR})$$

The first term in Equation (5) is a non-linear phase coming from the cavity. When $v=mv_c$, where m is an integer, one has $\Psi c=2$ mπ. On the other hand, the second term of Equation (5) is a linear phase from the optical path difference between two arms. With $v=mv_0$, the linear phase is 2mπ. The third term in equation (3) is the phase generated by the beam splitter coating. In general, it is polarization dependant When the beam splitter is coated symmetrically, this term goes to zero (since it makes no difference for the beam being incident from the front side of the beam splitter or rear side of the beam splitter). Under such condition, the phase difference between the two interference beams at bottom arm is not dependant on the incident polarization. In the following analysis, the third term is set to zero.

Back to equation (5), to have a phase step of π for $\Psi_B$, one has to set $v_0=-2v_c$, yielding $$\psi_B = \psi_c - \pi\frac{v}{v_c} = 2\tan^{-1}\left[\alpha\tan\left(\pi\frac{v}{v_c}\right)\right] - \pi\frac{v}{v_c}$$

$$\psi_B = \begin{cases} 0, & \text{for } v = 2mv_c \\ \pi, & \text{for } v = (2m+1)V_c \end{cases}$$

To make the phase difference $\Psi_B$ like a step function shown in FIG. 5, the slope of $\Psi_B$ near the multiple integer of $v_c$ should be close to zero.

$$\frac{d\psi_B}{dv} \to 0 \text{ as } v = mv_c$$

$$\Rightarrow \alpha \approx 0.5 \text{ (corresponding to } r \approx 0.33)$$

Figure 8B:
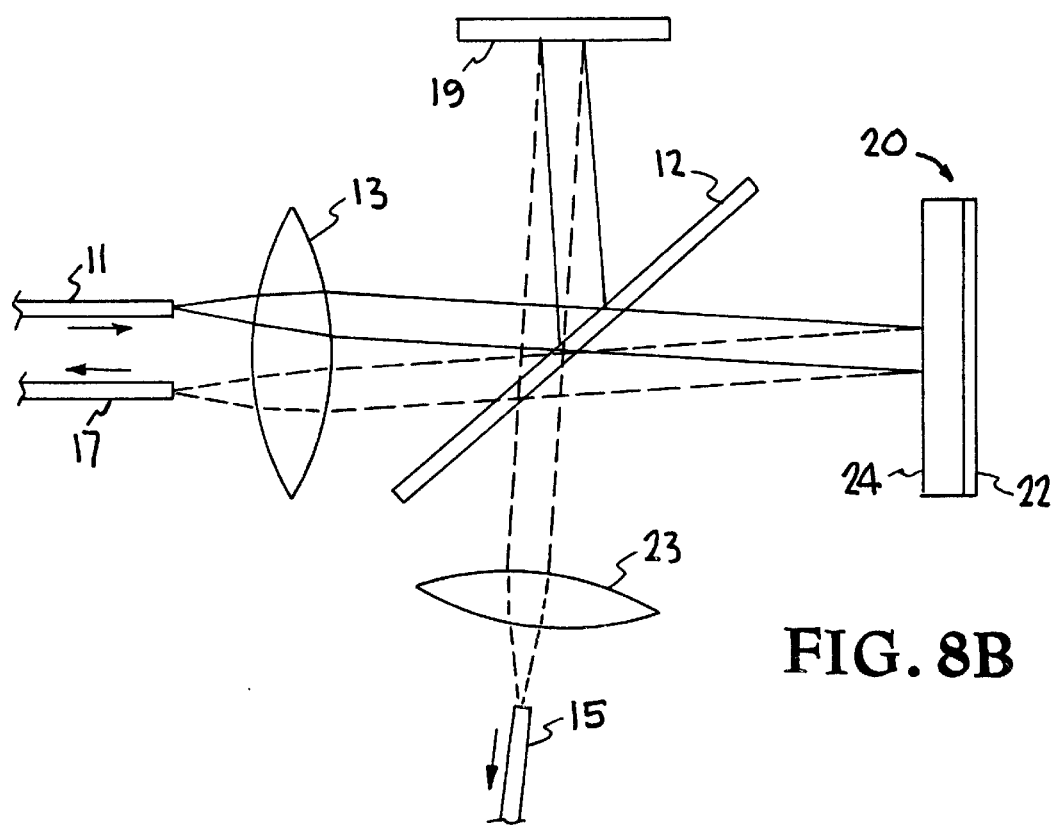
FIG. 8B shows an embodiment of an interleave device used as a demultiplexer. The input fiber 11 contains all the wavelengths. After interference, the light of odd wavelengths goes to output fiber 1 (fiber 17) and that of even wavelengths goes output fiber 2 (fiber 15). This device can also be used as a multiplexer by sending light of even wavelengths through fiber 15 and light of odd wavelengths through fiber 17. After interference, all the light will come out from fiber 11.
Figure 9:
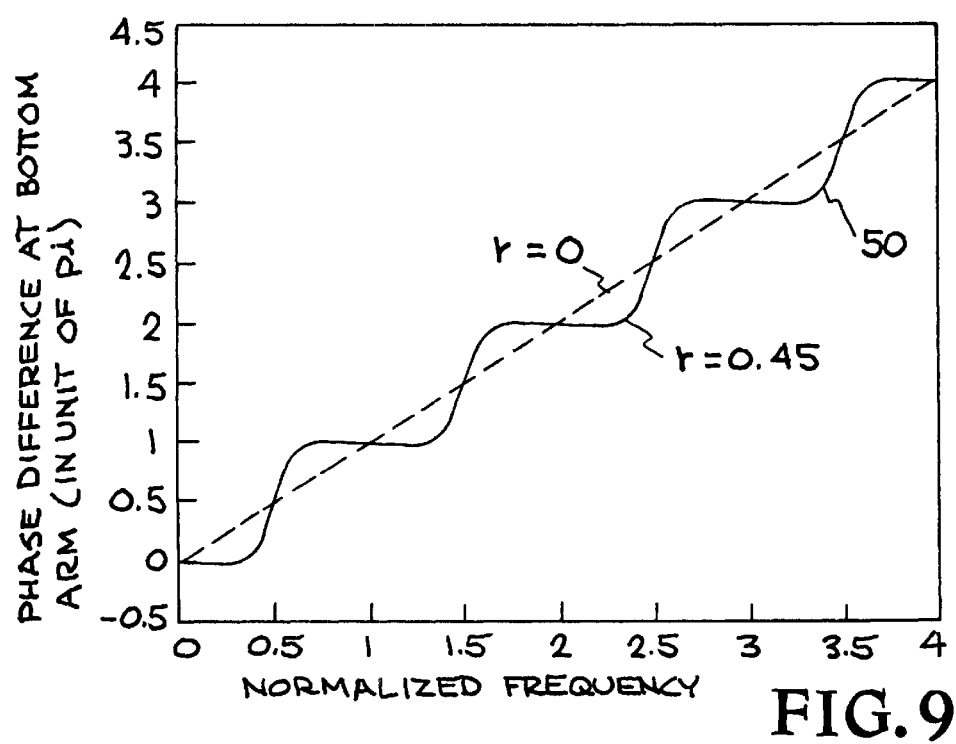
FIG. 9 shows the phase difference of the two interference beams at the bottom arm, $\Psi_B$ for r=0 (dashed) and 0.45 (solid).

If the third term in equation (5) is not zero and its value is dependant on the polarization of the incident beam, it can result in certain problems. Firstly, the optical signal at bottom arm will peak at different frequencies for different polarizations. Therefore, when the incident polarization includes both P and S, the fringe contrast will be degraded. Secondly, when the transmission curve is perfect for the S-polarized light (like FIG. 4), the phase offset in the P-polarized light worsens the performance of the channel isolation. To make $\Psi_B$ polarization independent, one has to design the internal beam splitting coating of the beamsplitter (BS) such that $\Psi_{SR}-\Psi_{SR'}=\Psi_{PR}-\Psi_{PR'}$. One of the choices is to make the coating symmetric, which means the beam will see the same layer structure whether it is incident from the front side or the rear side. Such condition guarantees that $\Psi_{SR}=\Psi_{SR'}$ and $\Psi_{PR}=\Psi_{PR'}$ at all times. Other than this, one can place a phase retardation plate in the optical path to compensate the phase difference between P- and S-polarized light FIG. 8B shows an interleave device used as a demultiplexer. It consists of three components, (i) a beam splitter 12, (ii) a reflection surface 19 and a cavity 20. In this example, the cavity is composed of an air-gap sandwiched by two pieces of reflection surfaces (shown in FIG. 6). The first surface 24 has power reflectivity of 20% (the amplitude reflectivity r=0.45) and the second surface 22 has power reflectivity near 100%. The light from the input fiber 11 has all the wavelengths (λ=1, 2, 3, 4, etc.). After lens 13, they are collimated. The beam splitter reflects about 50% of light to the bop mirror 19 and transmits the rest of light to the cavity 20. The phase of light reflected from mirror 19 is proportional to the optical frequency and that of the light reflected from the cavity is a non-linear function of the optical frequency At the bottom arm (output fiber 15), the frequency dependence of the phase difference between these two beams is shown in FIG. 9, curve 50. The light of normalized optical frequencies at an even number produces constructive interference at the bottom channel and that of an odd number produces constructive interference at output fiber 17. Therefore, the light of wavelength λ=1, 3, 5, etc. will be focused by lens 13 into output fiber 17 and that of wavelength λ=2, 4, 6, etc. will be focused by lens 23 into output fiber 15. The odd and even channels are thus interleaved to different outputs. This device can also be used as a multiplexer by sending light of even wavelengths through fiber 15 and light of odd wavelengths through fiber 17. After interference, all the light will come out from fiber 11.

Figure 8C:
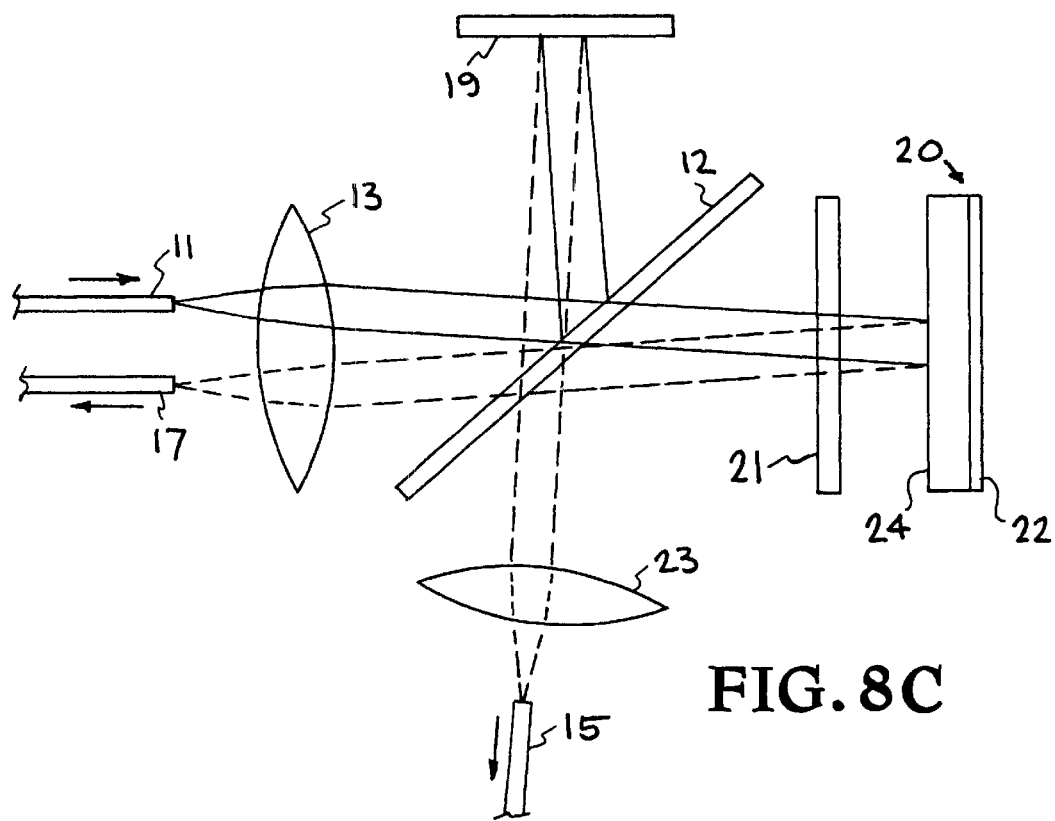
FIG. 8C shows a phase retardation plate placed in the right arm to generate a required phase difference between P- and S-polarized light.

In FIG. 8C, a phase retardation plate 21 is placed in the right arm to generate a phase difference between P- and S-polarized light, such that $\psi_{SR}-\psi_{SR'}+\psi_{ret}=\psi_{PR}-\psi_{PR'}$ where $\Psi$ret is phase retardation introduced by the phase plate during the round trip.

From now on, it is assumed that the coating on the BS cube and the mirrors have been provided so that $\Psi_{SR}-\Psi_{SR'}=\Psi_{PR}-\Psi_{PR'}=0$.

According to Equation (5), the optical power at the bottom arm is as follows.

$$P_B = \cos^2\left(\frac{\psi_B}{2}\right)$$

The optical power at the left arm is $$P_L = 1 - P_B = \sin^2\left(\frac{\psi_B}{2}\right)$$

Figure 10:
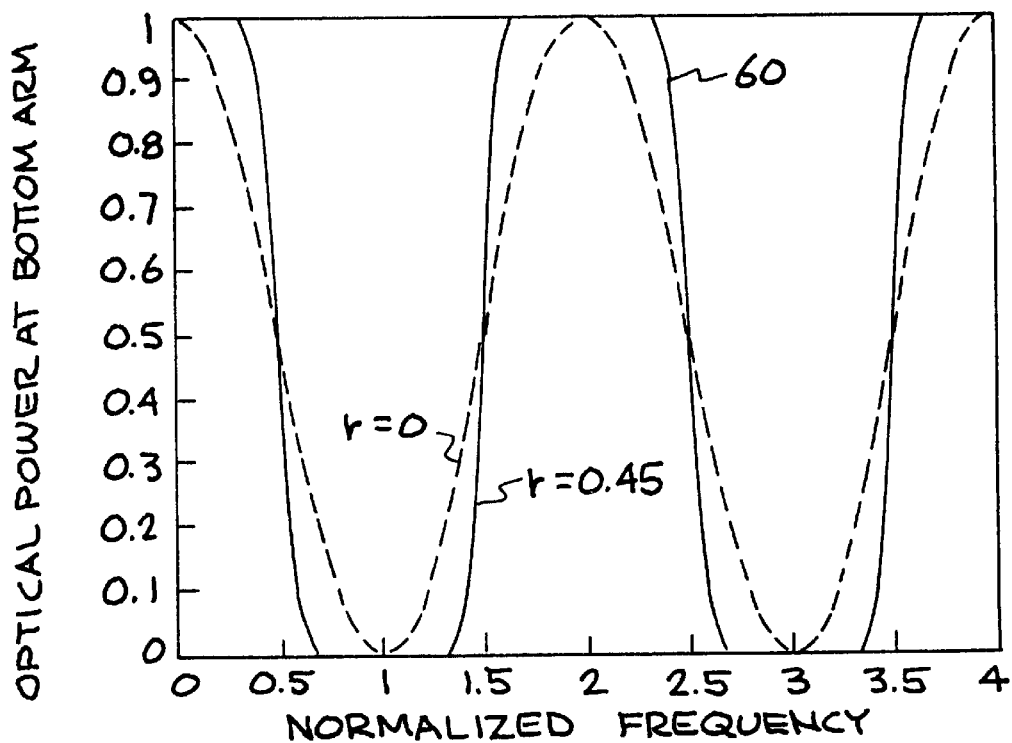
FIG. 10 is the optical power at the bottom arm for r=0 (dashed) and 0.45 (solid).

FIG. 9 shows the phase difference, $\Psi_B$, as a function of normalized frequencies $v_c$ for r=0(dash) and 0.45 (solid). It is seen that when the frequencies are an even integer, the phase difference, $\Psi_B$, is 2 Π, and when the frequencies are an odd integer, the phase difference is Π. For the curve of r=0.45, shown in plot 50, the slope of the phase curve is very close to zero when the normalized frequencies are integers. This makes it possible that the phase stays at Π in the neighborhood of odd integers and at 2 Π in the neighborhood of even integers, which is similar to the ideal phase difference between the two interference beams shown in FIG. 5. FIG. 10 shows the optical power as a function of frequency at the bottom arm for r=0 (dash) and 0.45 (solid). For the case of r=0.45, shown in plot 60, the shape of transmission curve is fairly close to the ideal case shown in FIG. 4.

Figure 11:
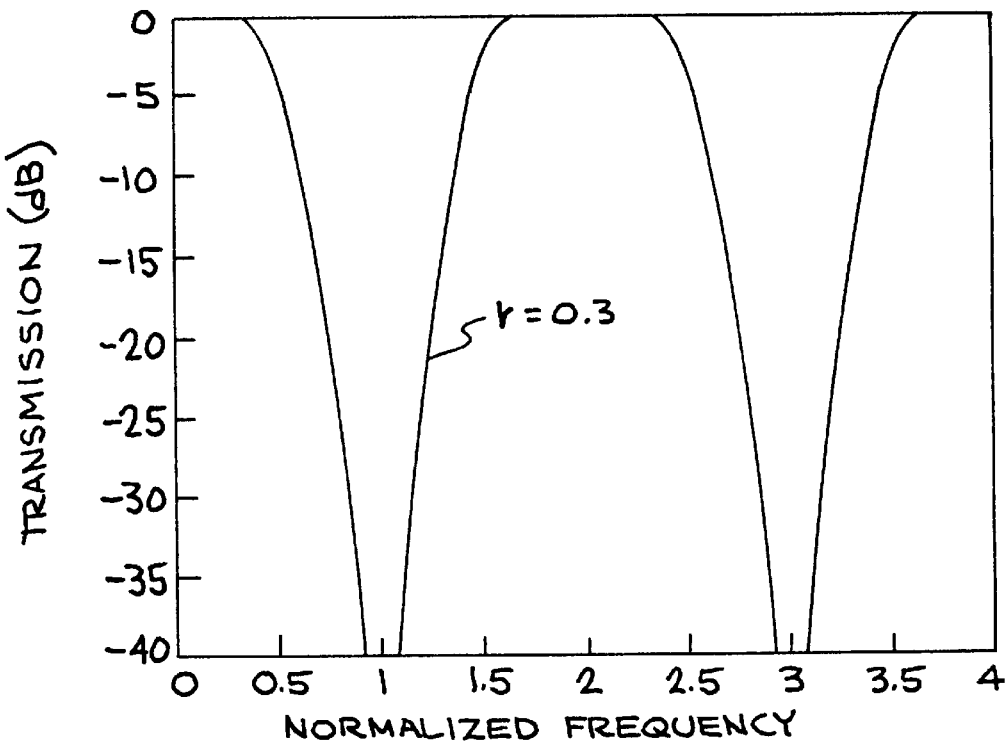
FIG. 11 shows the optical power at the bottom arm for r=0.3 in the logarithm scale.
Figure 12:
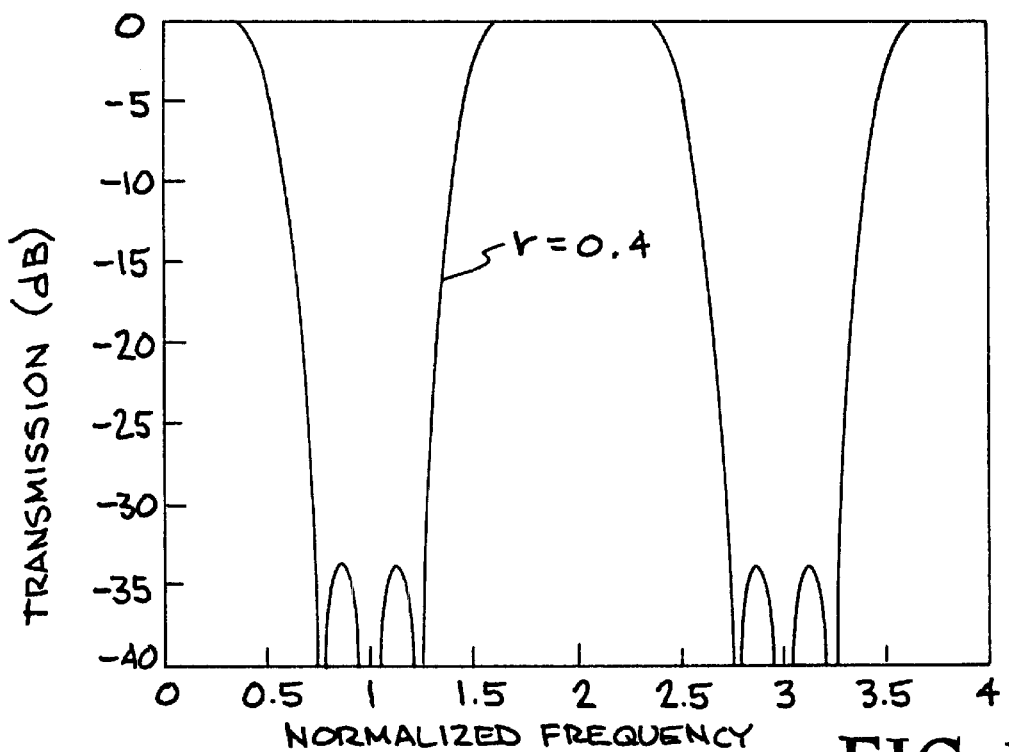
FIG. 12 is the optical power at the bottom arm for r=0.4 in the logarithm scale.
Figure 13:
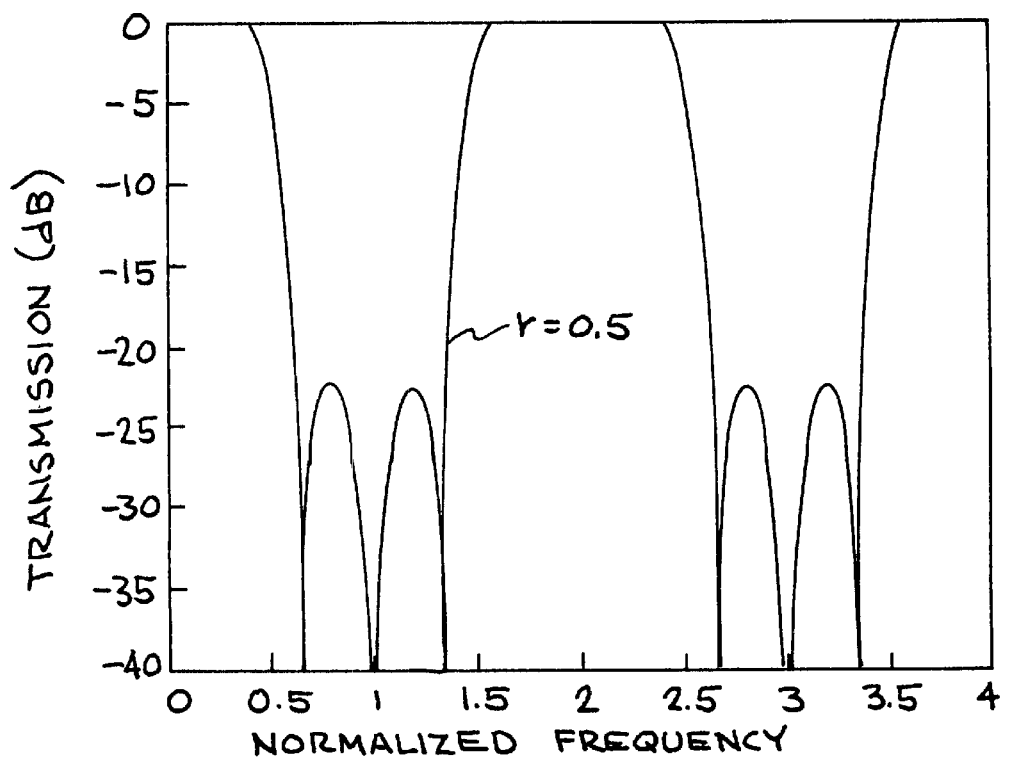
FIG. 13 is the optical power at the bottom arm for r=0.5 in the logarithm scale.

FIGS. 11, 12 and 13 are the 10log10 (dB) plots of optical power at the bottom arm for r=0.3, 0.4 and 0.5 respectively. It is seen that when the reflectivity is low, the isolation in the blocked band is better. For instance, in FIG. 11, with r=0.3, the isolation is better than −40 dB. In contrast, in FIG. 13, with r=0.5, the isolation is −22 dB. The advantage of higher reflectivity is that the transmission curve will fall off steeper.

Figure 14:
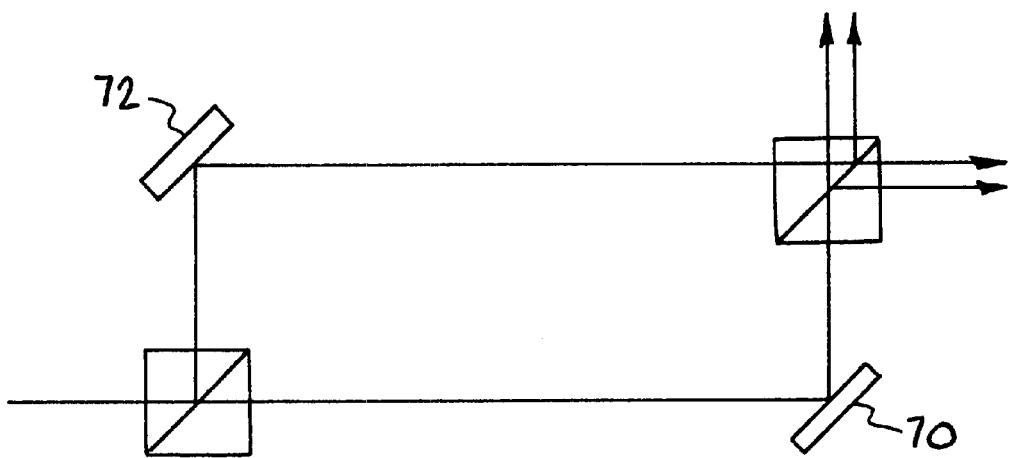
FIG. 14 shows a Mach-Zehnder type step-phase interferometer where the right arm is a regular mirror to create a linear phase and the cavity at the top arm is a non-linear phase generator.

FIG. 14 shows a Mach-Zehnder type step-phase interferometer where the right arm includes a regular mirror 70 to create a linear phase and the top arm includes a non-linear phase generator 72.

Figure 15:
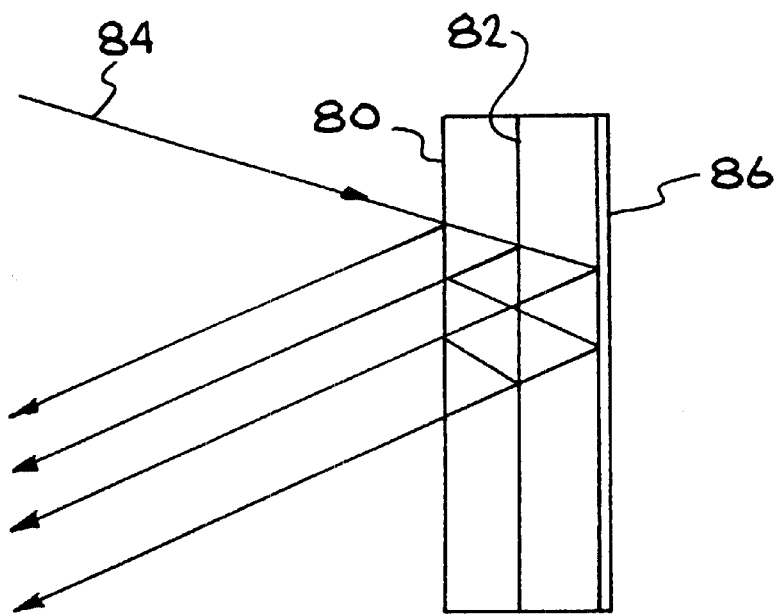
FIG. 15 shows another type of non-linear phase generator, consisting of three reflection surfaces where the first two surfaces partially reflect the incident beam (with amplitude reflectivity of r1 and r2) and the third surface has amplitude reflectivity close to 1.

FIG. 15 shows another type of non-linear phase generator, consisting of three reflection surfaces where the first two surfaces 80 and 82 partially reflect the incident beam 84 (with amplitude reflectivity of r1 and r2) and the third surface 86 has reflectivity close to 100%.

Figure 16:
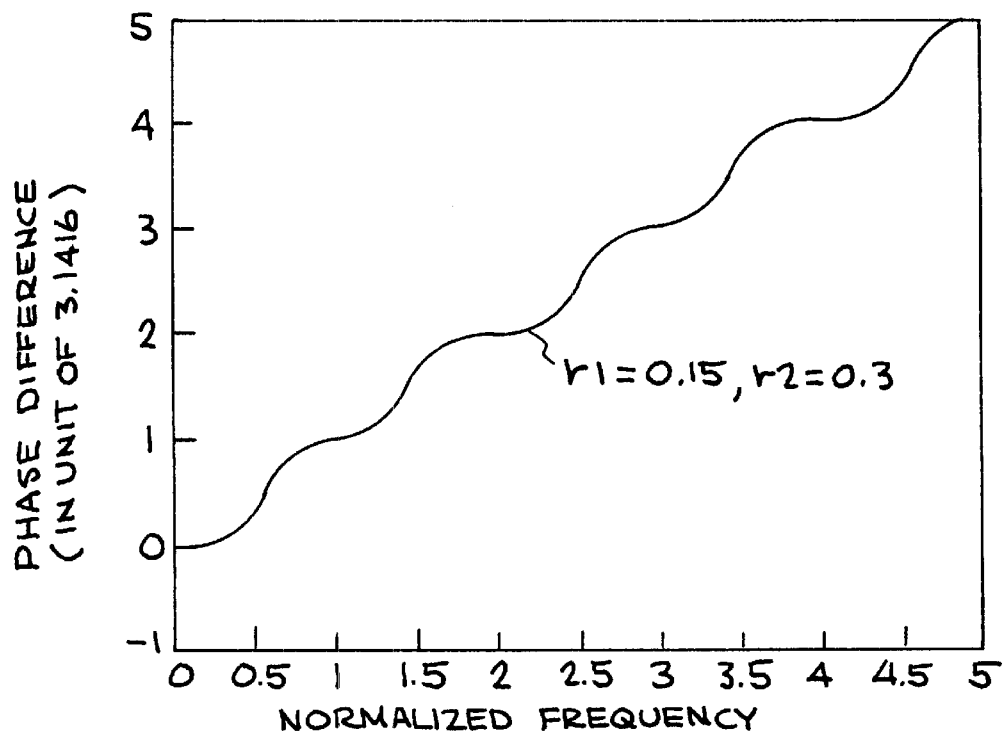
FIG. 16 shows the phase difference, $\Psi_B$, of the two interference beams at one of the output arm for a step-phase interferometer with a three surface non-linear phase generator (such as shown in FIG. 15), of r1=0.15, r2=0.3.

FIG. 16 shows the phase difference between the two interference beams, $\Psi_B$ at one of the output arms for a step-phase interferometer with a three surface non-linear phase generator (such as shown in FIG. 15), of r1=0.15, r2=0.3. The two sub-cavities have the same optical length and the characteristic frequency is corresponding to the total optical path length of the cavity.

Figure 17:
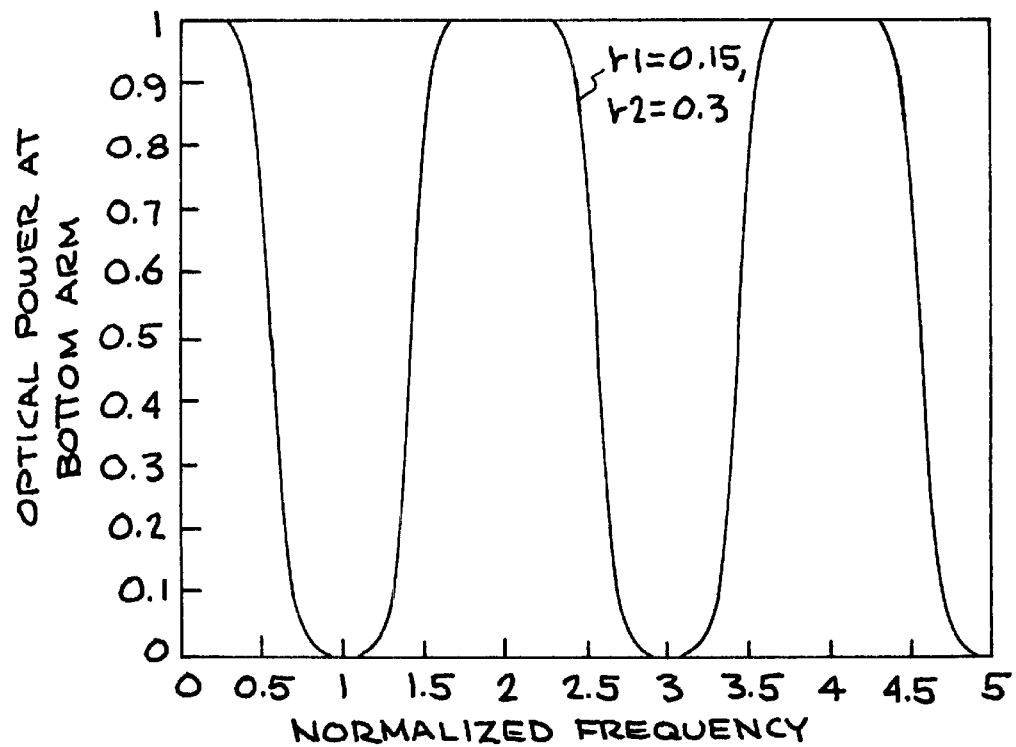
FIG. 17 shows the optical power at one of the output arms for a step-phase interferometer with a three-surface non-linear phase generator (the corresponding phase difference is shown in FIG. 16).

FIG. 17 shows the optical power at one of the output arms for a step-phase interferometer with a three-surface non-linear phase generator (the corresponding phase difference between the two interference beams is shown in FIG. 16). Notice that the duty cycle of the transmission curve is not 50%. The duty cycle is depending on the values of r1 and r2.

Figure 18:
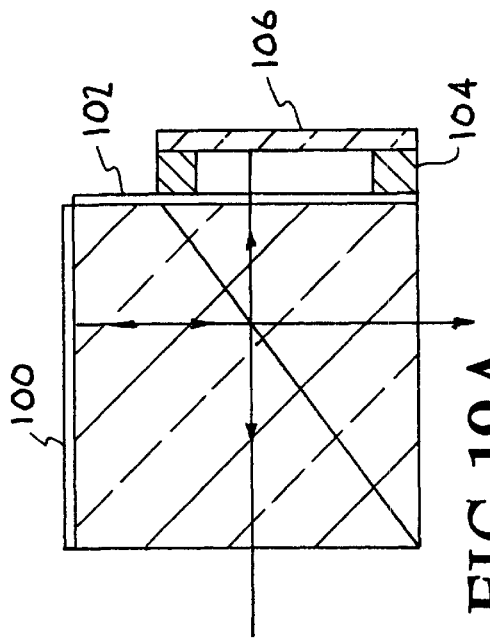
FIG. 18 shows an un-polarized 50/50 beam splitter where the light is to be incident from the left hand side. The left side and the bottom side of the beam splitter are AR-coated; the right side can be AR or partially reflecting (PR) coated and topside can be AR or mirror coated, depending on which scheme is being used.

FIG. 18 shows an un-polarized 50/50 beam splitter where the light is to be incident from the left hand side. Side 90 and side 92 are AR-coated, side 94 can be AR or partially reflecting (PR) coated, side 96 is AR or mirror coated, depending on which scheme being used.

FIG. 19A through 24 shows a variety of step-phase interferometers usable in the present invention.

Figure 19A:
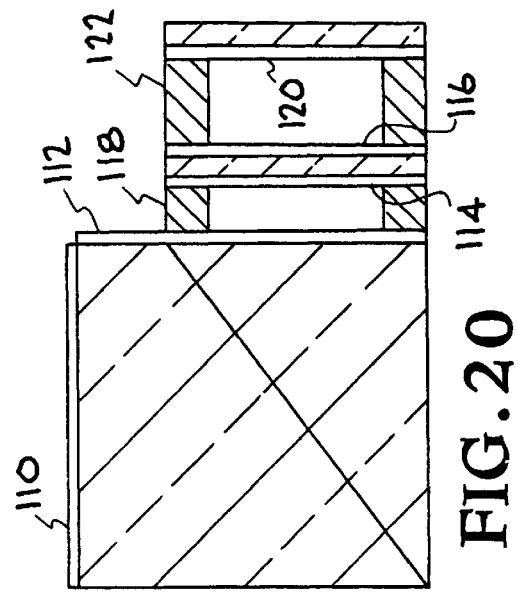
FIG. 19A shows an embodiment where the topside of cube is coated as a mirror to generate a linear phase and the right-hand side of cube is PR coated to be surface 1 of a non-linear phase generator.

FIG. 19A shows an embodiment where the topside 100 of the cube is coated as a mirror to generate a linear phase and the right-hand side 102 of cube is PR coated to be the first surface of a non-linear phase generator. A spacer(s) 104 provides a gap between the cube and a mirror coated surface 106. Spacer(s) 104 are preferably fabricated of a material having a low coefficient of thermal expansion, such as Zerodur.

Figure 19B:
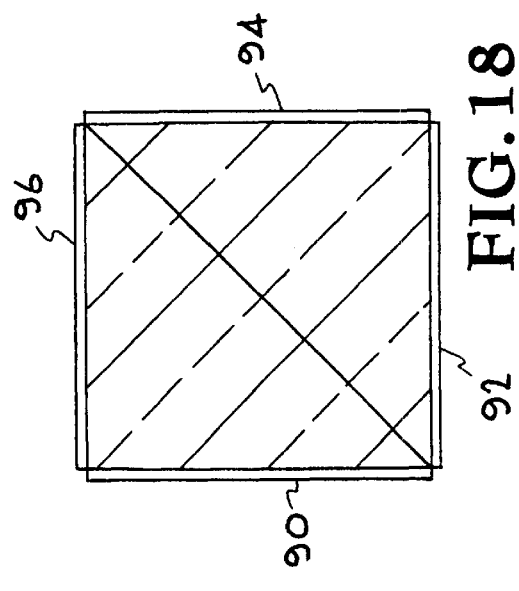
FIG. 19B shows the top mirror of FIG. 19A as an extra piece.

FIG. 19B is similar to 19A. Instead of making the mirror coating on the top 100 of cube, the mirror coating 103 is located on the second surface of extra piece 101 bonded to the top of cube. There are two advantages for this approach. Firstly, since it is an extra piece, one can control its thickness better. Notice that the error in thickness is related to the error in channel spacing of the communication system. Secondly, since the refraction index and the physical thickness of the mirror substrate changes with temperature, one can use an a thermal material as a substrate such that the temperature does not affect the optical path length (OPL). An a thermal material is a substance that the effect of temperature change on OPD due to the index of refraction is cancelled by the thermal expansion.

Figure 20:
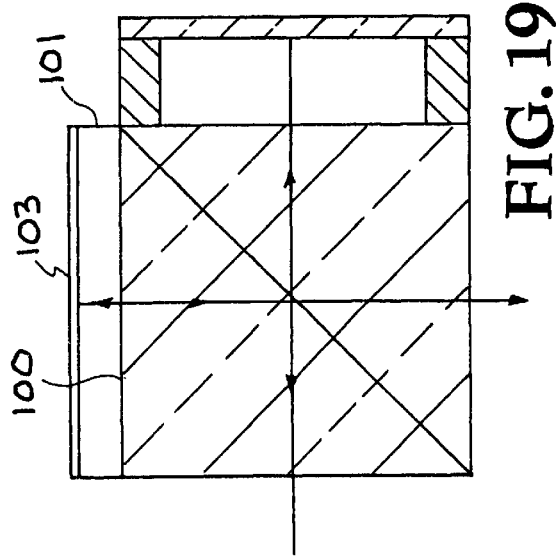
FIG. 20 shows an embodiment where the topside of cube is mirror coated to generate a linear phase, the right-hand side of cube is AR coated and the PR coating of the non-linear phase generator is an extra piece.

FIG. 20 shows an embodiment where the topside 110 of the cube is mirror coated to generate a linear phase, the right-hand side 112 of the cube is AR coated. An optically transmitting piece comprising a first surface 114 having an AR coating and a second surface 116 that has a PR coating is separated from the cube by a first spacer 118. A piece comprising a first surface with a mirror coating 120 is spaced apart from the second surface 116 with a second spacer(s) 122. The second surface 116 and the first surface 120 together form the non-linear phase generator in this embodiment.

FIG. 21 is an embodiment where the topside 130 of the cube is AR coated, the right-hand side 132 of the cube is PR coated to be first surface of a non-linear phase generator and the mirror 134 on the topside of cube is an extra piece separated from the cube by spacer(s) 136. An extra piece having a first surface 138 that is mirror coated is separated from surface 132 by another spacer(s) 140.

FIG. 22 shows an embodiment where the topside 150 of the cube is mirror coated to be a linear phase generator, the right-hand side 152 of the cube is AR coated and the non-linear phase is achieved by an external three-surface cavity comprising two AR coated surfaces 154, 156, two PR coated surfaces 158,160 and mirror 162.

FIG. 23 shows an embodiment where the topside 170 and right-hand side 172 of the cube are AR coated. The mirror 174 for a linear phase generator is separated from the cube by spacer(s) 176. Three external pieces form the non-linear phase generator. The first piece is separated from the cube with spacer 178, and comprises a first AR coated surface 180, and a second PR coated surface 182. The second piece is separated from the first piece by spacer 184 and comprises a first AR coated surface 186 and a second PR coated surface 188. The third piece is separated from the second piece with spacer 190 and comprises a first mirror surface 192.

FIG. 24 shows an embodiment where the topside 170 and right-hand side 172 of the cube are AR coated. The top mirror for a linear phase generator is separated from the cube by spacer(s) 200. The single external piece 202 that forms the non-linear phase generator is attached to the cube by spacers 204. The first surface 206 is PR coated and the second surface 208 is mirror coated.

The foregoing description of the invention has been presented for purposes of illustration and description and is not intended to be exhaustive or to limit the invention to the precise form disclosed. Many modifications and variations are possible in light of the above teaching. The embodiments were chosen and described to best explain the principles of the invention and its practical application to thereby enable others skilled in the art to best use the invention in various embodiments and with various modifications suited to the particular use contemplated. The scope of the invention is to be defined by the following claims.

I claim:

1. An optical step-phase interferometer, comprising:
 a beamsplitter to separate an incident beam of light into a first beam of light and a second beam of light;
 a reflector operatively positioned to reflect said first beam of light to produce a first reflected beam; and
 a non-linear phase generator (NLPG) operatively positioned to reflect said second beam of light to produce a second reflected beam, wherein said first reflected beam and said second reflected beam interfere with one another, wherein the frequency dependence of the phase difference between said first reflected beam and said second reflected beam has a step-like function.

2. The optical step-phase interferometer of claim 1, wherein the step of said phase difference is approximately Π.

3. The optical step-phase interferometer of claim 1, wherein said first reflected beam and said second reflected beam are combined into two interference beams at said beam splitter, wherein a first interference beam of said two interference beams carries a first subset of signals and a second interference beam of said two interference beams carries a second subset of signals, wherein said first subset of signals is directed to a first port and said second subset of signals is directed to a second port.

4. The optical step-phase interferometer of claim 1, wherein said reflector comprises a first surface reflector.

5. The optical step-phase interferometer of claim 1, wherein said reflector comprises a back surface reflector.

6. The optical step-phase interferometer of claim 1, wherein said NLPG comprises a first reflective surface and a second reflective surface that are separated.

7. The optical step-phase interferometer of claim 6, wherein said first reflective surface and said second reflective surface are separated by a cavity.

8. The optical step-phase interferometer of claim 7, wherein said cavity comprises an air-gap.

9. The optical step-phase interferometer of claim 6, wherein said first reflective surface comprises a partially reflective coating having a reflectivity that is less than one.

10. The optical step-phase interferometer of claim 6, wherein said second reflective surface comprises nearly 100% reflectivity.

11. The optical step-phase interferometer of claim 7, wherein said cavity comprises optically transparence material.

12. The optical step-phase interferometer of claim 11, wherein said first reflective surface comprises a partially reflective coating having a reflectivity that is less than one.

13. The optical step-phase interferometer of claim 12, wherein said second reflective surface comprises nearly 100% reflectivity.

14. The optical step-phase interferometer of claim 1, wherein said beamsplitter comprises an unpolarized beamsplitter.

15. The optical step-phase interferometer of claim 14, wherein said unpolarized beamsplitter comprises an internal beam-splitting coating such that $\Psi_{SR}-\Psi_{SR'}=\Psi_{PR}-\Psi_{PR'}$.

16. The optical step-phase interferometer of claim 14, wherein said unpolarized beamsplitter comprises an internal beam-splitting coating that affects the phase of said first beam and said second beam such that $(\Psi_{SR}-\Psi_{SR'})-(\Psi_{PR}-\Psi_{PR'})$ is minimized.

17. The optical step-phase interferometer of claim 14, wherein said unpolarized beamsplitter comprises an internal beam-splitting coating that affects the phase of said first beam and said second beam such that $(\Psi_{SR}-\Psi_{SR'})-(\Psi_{PR}-\Psi_{PR'})$ is approximately zero.

18. The optical step-phase interferometer of claim 14, wherein said unpolarized beamsplitter comprises a symmetrical internal beam-splitting coating.

19. The optical step-phase interferometer of claim 14, further comprising a wave plate operatively placed in said first beam or said second beam to compensate the polarization dependent phase difference from said unpolarized beam splitter.

20. The optical step-phase interferometer of claim 1, wherein the optical path of said first beam is less than that of said second beam.

21. The optical step-phase interferometer of claim 1, wherein said NLPG comprises a cavity having an optical path length, wherein the optical path length difference (OPLD) between said first beam and said second beam is approximately half of the optical path length of said cavity.

22. The optical step-phase interferometer of claim 1, further comprising a second beamsplitter positioned to combine said first beam and said second beam to interfere with each other, wherein said optical step-phase interferometer is configured as an optical interleaving Mach-Zehnder type step-phase interferometer.

23. The optical step-phase interferometer of claim 1, wherein said NLPG comprises a plurality of partially reflecting surfaces and a reflective surface comprising nearly 100% reflectivity.

24. The optical step-phase interferometer of claim 1, further comprising an input fiber optic to provide said incident beam.

25. The optical step-phase interferometer of claim 3, further comprising a first output fiber optic and a second output fiber optic, wherein said first output fiber optic is positioned at said first port to collect said first subset and wherein said second fiber optic is positioned at said second port to collect said second subset.

26. The optical step-phase interferometer of claim 1, further comprising at least one fiber optic positioned to collect a beam comprising the interference of said first reflected beam and second reflected beam.

27. The optical step-phase interferometer of claim 3, further comprising a circulator to redirect said the first subset of optical signal into a first port.

28. The optical step-phase interferometer of claim 1, wherein said reflector comprises material that is a thermal.

29. The optical step-phase interferometer of claim 14, wherein said reflector is a surface of said unpolarized beamsplitter, wherein said unpolarized beamsplitter comprises a partially reflecting surface of said NLPG, wherein said optical step-phase interferometer further comprises at least one spacer to provide at least one cavity between said partially reflecting surface and a mirror coated surface.

30. The optical step-phase interferometer of claim 29, wherein said at least one spacer comprises a material having a low coefficient of thermal expansion.

31. The optical step-phase interferometer of claim 14, wherein said reflector comprises a separate piece of material that is fixedly attached to a surface of said unpolarized beamsplitter, wherein said unpolarized beamsplitter comprises a partially reflecting surface of said NLPG, wherein said optical step-phase interferometer further comprises a spacer to provide a cavity between said partially reflecting surface and a mirror coated surface of said NLPG.

32. The optical step-phase interferometer of claim 31, wherein a spacer is used to fixedly attached said reflector to said surface of said unpolarized beamsplitter.

33. The optical step-phase interferometer of claim 32, wherein a reflector coating is on the back side of said separated piece of material.

34. An optical step-phase interferometer, comprising:
a first input fiber for providing a first set of wavelengths;
a second input fiber optic for providing a second set of wavelengths;
a reflector operatively positioned to reflect said first set of wavelengths to produce a first reflected beam;
a non-linear phase generator (NLPG) operatively positioned to reflect said second set of wavelengths to produce a second reflected beam; and
a beamsplitter to combine said first reflected beam and said second reflected beam into a third fiber optic.

35. A method of interleaving frequencies of light, comprising:
separating an incident beam of light into a first beam of light and a second beam of light;
reflecting said first beam of light to produce a first reflected beam; and
reflecting said second beam of light with a non-linear phase generator (NLPG) to produce a second reflected beam, wherein said first reflected beam and said second reflected beam interfere with one another, wherein the frequency dependence of the phase difference between said first reflected beam and said second reflected beam has a step-like function.

36. The method of claim 35, wherein the step of said phase difference is approximately Π.

37. The method of claim 35, wherein said first reflected beam and said second reflected beam are combined into two interference beams at said beam splitter, wherein a first interference beam of said two interference beams carries a first subset of signals and a second interference beam of said two interference beams carries a second subset of signals, wherein said first subset of signals is directed to a first port and said second subset of signals is directed to a second port.

38. The method of claim 35, wherein the step of separating an incident beam is carried out with an unpolarized beamsplitter, the method further comprising compensating for any polarization dependent phase difference generated by said unpolarized beam splitter.

39. The method of claim 38, wherein the step of compensating for any polarization dependent phase difference is carried out with an internal coating within said unpolarized beamsplitter, wherein said internal coating affects the phase of said first beam and said second beam such that $(\Psi_{SR}-\Psi_{RS'})-(\Psi_{PR}-\Psi_{PR'})$ is minimized.

40. The method of claim 38, wherein the step of compensating for any polarization dependent phase difference is carried out with a wave plate operatively placed in said first beam or said second beam.

41. The method of claim 35, where the optical path of said first reflected beam is less than that of said second reflected beam.

42. The method of claim 35, wherein said NLPG comprises a cavity having a cavity length, wherein the optical path length difference (OPLD) between said first beam and said second beam is approximately half of said the optical path length of the cavity.

43. The method of claim 35, further comprising a second beamsplitter positioned to combine said first beam and said second beam, wherein said first reflected beam and said second reflected beam interfere with one another, wherein said optical step-phase interferometer is configured as an optical interleaving Mach-Zehnder type interferometer.

44. The method of claim 35, further comprising providing said incident beam from an input fiber optic.

45. The method of claim 35, further comprising positioning at least one fiber optic to collect the interference beam of said first reflected beam with said second reflected beam.

46. The method of claim 37, wherein an interference beam is produce when said first reflected beam and said second reflected beam interfere with one another, the method further comprising positioning a circulator to collect said interference beam.

* * * * *